US012662303B2

(12) United States Patent
Minnette

(10) Patent No.: US 12,662,303 B2
(45) Date of Patent: Jun. 23, 2026

(54) ACTUATOR BASED PACKAGING FOR USE WITH CARTRIDGE REFILLS

(71) Applicant: Nypro Inc., Clinton, MA (US)

(72) Inventor: Jeffrey C. Minnette, Clinton, MA (US)

(73) Assignee: Nypro Inc., Clinton, MA (US)

(*) Notice: Subject to any disclaimer, the term of this patent is extended or adjusted under 35 U.S.C. 154(b) by 476 days.

(21) Appl. No.: 18/021,041

(22) PCT Filed: Aug. 13, 2021

(86) PCT No.: PCT/US2021/045935
§ 371 (c)(1),
(2) Date: Feb. 13, 2023

(87) PCT Pub. No.: WO2022/036213
PCT Pub. Date: Feb. 17, 2022

(65) Prior Publication Data

US 2023/0303309 A1 Sep. 28, 2023

Related U.S. Application Data

(60) Provisional application No. 63/065,838, filed on Aug. 14, 2020.

(51) Int. Cl.
*B65D 83/00* (2006.01)
*B05B 11/00* (2023.01)
(Continued)

(52) U.S. Cl.
CPC ...... *B65D 83/7713* (2025.01); *B05B 11/0032* (2013.01); *B05B 11/0038* (2018.08);
(Continued)

(58) Field of Classification Search
CPC .......... B65D 83/7713; B65D 2583/005; B65D 83/771; B05B 11/0032; B05B 11/0038; B05B 11/0054; B05B 11/02; B05B 11/06
See application file for complete search history.

(56) References Cited

U.S. PATENT DOCUMENTS 2,618,883 A * 11/1952 Morsink .............. B05B 11/062 222/398
3,294,289 A * 12/1966 Bayne ................. B67D 1/0462 222/386.5
(Continued)

FOREIGN PATENT DOCUMENTS

CN 1291958 A 4/2001
CN 201728661 U 2/2011
(Continued)

OTHER PUBLICATIONS

Office Action with English translation issued in corresponding CN Application No. 202180067661.4, dated Jul. 17, 2025.

*Primary Examiner* — Frederick C Nicolas
(74) *Attorney, Agent, or Firm* — Young Basile Hanlon & MacFarlane, P.C.

(57) ABSTRACT

Disclosed herein are actuator based packages for use with cartridge refills. A package includes a container configured to hold a cartridge refill, a replaceable cap configured to fit the container, and an actuator mechanism integral with the container. The actuator mechanism is configured to compress the cartridge refill to dispense a useable material contained in the cartridge refill. The actuator mechanism can be a pump mechanism. The actuator mechanism can be a slider mechanism.

13 Claims, 6 Drawing Sheets

(51) Int. Cl.
*B05B 11/02* (2023.01)
*B05B 11/06* (2006.01)

(52) U.S. Cl.
CPC .......... *B05B 11/0054* (2013.01); *B05B 11/02* (2013.01); *B05B 11/06* (2013.01); *B65D 83/771* (2025.01); *B65D 2583/005* (2013.01)

(56) References Cited

U.S. PATENT DOCUMENTS

| | | | | |
|---|---|---|---|---|
| 3,417,901 | A * | 12/1968 | Sands | B65D 83/62 141/3 |
| 4,020,975 | A * | 5/1977 | Stauffer | B65D 35/28 222/93 |
| 4,760,937 | A * | 8/1988 | Evezich | B65D 83/771 222/209 |
| 4,763,818 | A * | 8/1988 | Stefano | B65D 83/771 222/401 |
| 4,842,165 | A * | 6/1989 | Van Coney | B65D 47/2018 222/105 |
| 5,029,738 | A * | 7/1991 | Dillon | B05C 17/00516 222/326 |
| 5,096,092 | A * | 3/1992 | Devine | B67D 1/0462 222/105 |
| 5,238,150 | A * | 8/1993 | Williams | B65D 83/60 222/386 |
| 5,312,018 | A * | 5/1994 | Evezich | B65D 83/771 222/105 |
| 5,332,121 | A * | 7/1994 | Schmidt | B67D 1/0462 222/105 |
| 6,223,941 | B1 * | 5/2001 | Nealey | B05C 17/015 222/105 |
| 6,365,202 | B1 * | 4/2002 | Ida | A61J 9/04 215/11.4 |
| 6,672,479 | B2 * | 1/2004 | Shiraishi | B65D 47/2031 222/215 |
| 7,395,949 | B2 * | 7/2008 | Ehret | B67D 1/045 222/400.7 |
| 7,874,467 | B2 * | 1/2011 | Pardes | B05B 11/1005 222/326 |
| D645,754 | S | 9/2011 | Corbett et al. | |
| 8,408,426 | B2 * | 4/2013 | Bakhos | B65D 81/245 222/105 |
| 8,430,262 | B2 | 4/2013 | Corbett et al. | |
| D692,768 | S | 11/2013 | Corbett et al. | |
| D692,769 | S | 11/2013 | Corbett et al. | |
| D694,635 | S | 12/2013 | Corbett et al. | |
| 8,663,419 | B2 | 3/2014 | Corbett et al. | |
| 8,807,377 | B2 | 8/2014 | Corbett et al. | |
| 8,991,635 | B2 | 3/2015 | Myerscough | |
| 9,126,717 | B2 | 9/2015 | Myerscough | |
| 9,126,719 | B2 | 9/2015 | Corbett et al. | |
| 9,452,857 | B2 | 9/2016 | Corbett et al. | |
| 9,574,307 | B2 | 2/2017 | Corbett et al. | |
| 10,005,222 | B2 | 6/2018 | Corbett et al. | |
| 10,005,605 | B2 | 6/2018 | Corbett et al. | |
| 10,202,218 | B2 * | 2/2019 | Eguchi | B65D 79/008 |
| 10,822,135 | B2 * | 11/2020 | Taruno | B65D 51/222 |
| 11,167,904 | B2 | 11/2021 | Corbett et al. | |
| 11,286,104 | B2 | 3/2022 | Corbett et al. | |
| 11,383,887 | B2 | 7/2022 | Corbett et al. | |
| 2004/0245289 | A1 | 12/2004 | Py et al. | |
| 2007/0051749 | A1 | 3/2007 | Fleet et al. | |
| 2009/0224002 | A1 * | 9/2009 | Bakhos | B65D 47/2018 222/386.5 |
| 2009/0236374 | A1 * | 9/2009 | Pardes | B05B 11/1032 222/494 |
| 2011/0290798 | A1 | 12/2011 | Corbett et al. | |
| 2012/0024897 | A1 | 2/2012 | Corbett et al. | |
| 2012/0074174 | A1 | 3/2012 | Pollack et al. | |
| 2012/0111894 | A1 * | 5/2012 | Bakhos | B67D 7/0244 222/386.5 |
| 2012/0145710 | A1 | 6/2012 | Corbett et al. | |
| 2013/0327737 | A1 | 12/2013 | Lee | |
| 2014/0252032 | A1 | 9/2014 | Corbett et al. | |
| 2015/0314916 | A1 | 11/2015 | Corbett et al. | |
| 2015/0360830 | A1 * | 12/2015 | Niggemyer | B65D 75/5883 222/173 |
| 2016/0159545 | A1 | 6/2016 | Corbett et al. | |
| 2019/0135479 | A1 | 5/2019 | Corbett et al. | |
| 2021/0284418 | A1 | 9/2021 | Corbett et al. | |
| 2022/0169437 | A1 | 6/2022 | Corbett et al. | |
| 2022/0340335 | A1 | 10/2022 | Corbett et al. | |
| 2023/0054953 | A1 | 2/2023 | Graham et al. | |
| 2023/0331449 | A1 | 10/2023 | Graham et al. | |
| 2023/0371675 | A1 | 11/2023 | Graham et al. | |

FOREIGN PATENT DOCUMENTS

| | | | |
|---|---|---|---|
| EP | 0144925 | A2 | 6/1985 |
| FR | 2916370 | A1 | 11/2008 |
| JP | H10120054 | A | 5/1998 |
| KR | 10-2006-0090790 | A | 8/2006 |
| KR | 10-2013-0030192 | A | 3/2013 |
| KR | 10-1323374 | B1 | 10/2013 |
| WO | 9944913 | A1 | 9/1999 |
| WO | 2010128768 | A2 | 11/2010 |
| WO | 2014031869 | A1 | 2/2014 |
| WO | 2022055921 | A1 | 3/2022 |

* cited by examiner

FIG. 15B
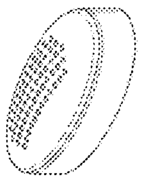
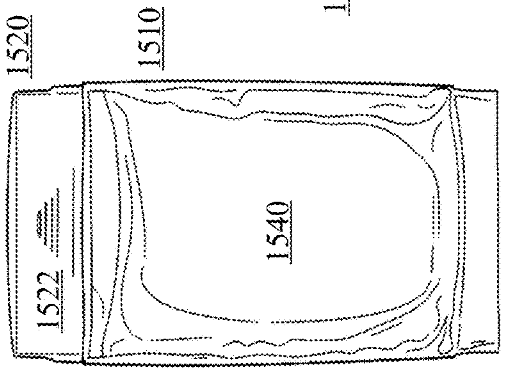
FIG. 15A
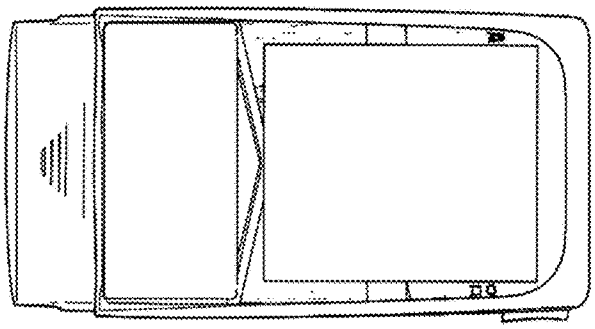
FIG. 14
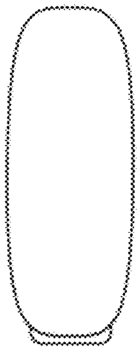
FIG. 13B
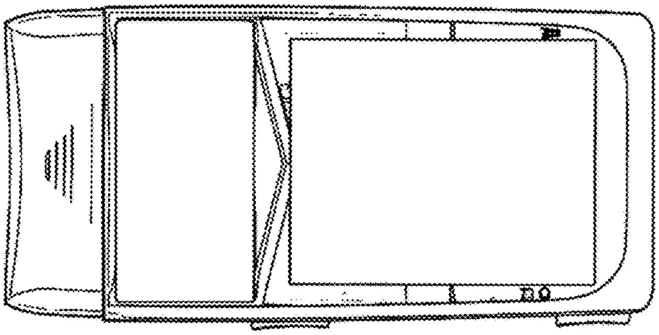
FIG. 13A
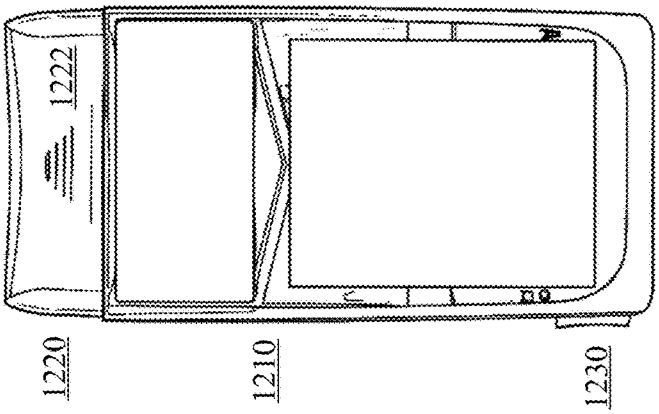
FIG. 12

ACTUATOR BASED PACKAGING FOR USE WITH CARTRIDGE REFILLS

CROSS-REFERENCE TO RELATED APPLICATION(S)

This application is a national stage entry of International Patent Application Serial No. PCT/US2021/045935, filed Aug. 13, 2021, which claims priority to U.S. Provisional Application Ser. No. 63/065,838, filed Aug. 14, 2020, the entire disclosures of which are incorporated herein.

TECHNICAL FIELD

This disclosure relates to packaging and in particular, packages having actuators to dispense content from cartridge refills.

SUMMARY

Disclosed herein are methods and packages which have actuators to dispense content from refill cartridges.

In implementations, a package includes a container configured to hold a cartridge refill, a replaceable cap configured to fit the container, and an actuator mechanism integral with the container. The actuator mechanism is configured to compress the cartridge refill to dispense a useable material contained in the cartridge refill. In implementations, the actuator mechanism can be a pump mechanism. In implementations, the actuator mechanism can be a slider mechanism.

BRIEF DESCRIPTION OF THE DRAWINGS

The disclosure is best understood from the following detailed description when read in conjunction with the accompanying drawings and are incorporated into and thus constitute a part of this specification. It is emphasized that, according to common practice, the various features of the drawings are not to-scale. On the contrary, the dimensions of the various features are arbitrarily expanded or reduced for clarity.

FIG. 12 is an example of a slider actuated package in an initial state in accordance with implementations.

FIG. 13A is an example of a slider actuated package in a used state in accordance with implementations.

FIG. 13B is a top view of the slider actuated package of FIG. 13A in accordance with implementations.

FIG. 14 is an example of the slider actuated package of FIG. 13A or 13B with a cap off in accordance with implementations.

FIG. 15A is an example of a disposable cartridge for use in the slider actuated package of FIGS. 12-14 in accordance with implementations.

FIG. 15B is a top view of a dispensing surface of the disposable cartridge of FIG. 15A in accordance with implementations.

DETAILED DESCRIPTION

Figure 3B:
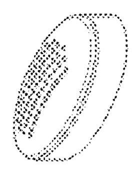
FIG. 3B is a top view of a dispensing surface of the disposable cartridge of FIG. 3A in accordance with implementations.

The figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions, and methods. Those of ordinary skill may thus recognize that other elements and/or steps may be desirable or necessary to implement the devices, systems, compositions, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Embodiments are provided throughout so that this disclosure is sufficiently thorough and fully conveys the scope of the disclosed embodiments to those who are skilled in the art. Numerous specific details are set forth, such as examples of specific aspects, devices, and methods, to provide a thorough understanding of embodiments of the present disclosure. Nevertheless, it will be apparent to those skilled in the art that certain specific disclosed details need not be employed, and that embodiments may be embodied in different forms. As such, the exemplary embodiments set forth should not be construed to limit the scope of the disclosure.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof.

The steps, processes, and operations described herein are thus not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

Yet further, although the terms first, second, third, etc. may be used herein to describe various elements, steps or aspects, these elements, steps, or aspects should not be limited by these terms. These terms may be only used to distinguish one element or aspect from another. Thus, terms such as "first," "second," and other numerical terms when used herein do not imply a sequence or order unless clearly indicated by the context. Thus, a first element, step, component, region, layer or section discussed below could be termed a second element, step, component, region, layer or section without departing from the teachings of the disclosure.

The non-limiting embodiments described herein are with respect to packages which have actuators to dispense content from refill cartridges or disposable cartridges. These packages may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the device and the methods for making the devices.

Disclosed herein are implementations of packages which have actuators to dispense content from at least one refill (e.g., replaceable) cartridges and which hold the refill cartridges. The implementations shown are illustrative and other implementations are within the scope of the specification and claims described herein. For purposes of illustration, certain aspects, features, and the like are described with respect to implementations. These aspects, features, and the like are appropriately applicable to and interchangeable with other implementations described herein.

In implementations, the packages which have actuators to dispense content from refill cartridges described herein use a combination of injection molding (IM), in-mold labeling (IML), lamination, and other like processing to manufacture containers, actuator mechanisms, caps, cartridge refills, and other elements using films, paper, recyclable materials, biodegradable materials, bio-based resins, sustainable materials, and the like. In implementations, the packaging is hybrid package using a combination of semi-rigid, flexible, and composite structures.

In implementations, a content filled disposable cartridge or refill cartridge is placed in an actuator based package. The actuator based package can be, but is not limited to, a pump based actuating mechanism, a slider based actuating mechanism, or the like.

Figure 3A:
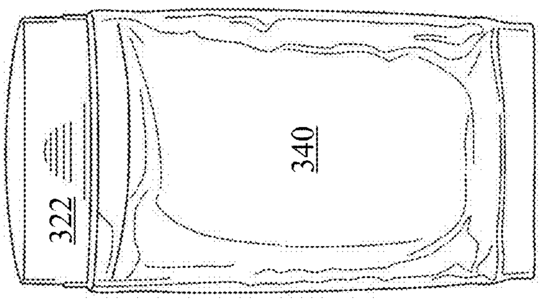
FIG. 3A is an example of a disposable cartridge for use in the pump actuated package of FIG. 1A in accordance with implementations.
Figure 2:
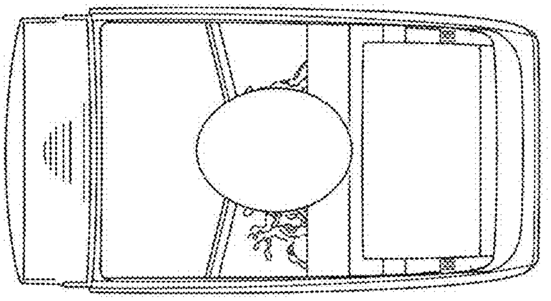
FIG. 2 is an example of the pump actuated package of FIG. 1A with a cap off in accordance with implementations.
Figure 1B:
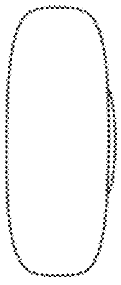
FIG. 1B is a top view of the pump actuated package of FIG. 1A in accordance with implementations.
Figure 1A:
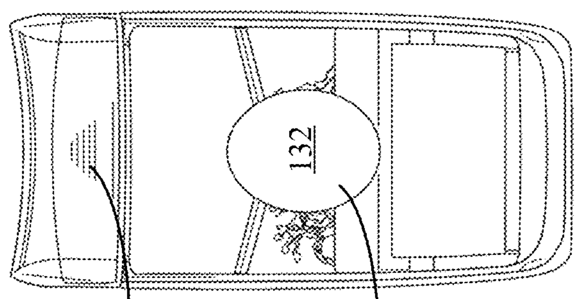
FIG. 1A is an example of a pump actuated package in accordance with implementations.

FIG. 1A is an example of a pump actuated package 100 in accordance with implementations. FIG. 1B is a top view of the pump actuated package 100 of FIG. 1A in accordance with implementations. FIG. 2 is an example of the pump actuated package 100 of FIG. 1A with a cap 120 off in accordance with implementations. FIG. 3A is an example of a disposable cartridge 300 for use in the pump actuated package 100 of FIG. 1A in accordance with implementations. FIG. 3B is a top view of a dispensing surface 324 of the disposable cartridge 300 of FIG. 3A in accordance with implementations.

Referring to FIGS. 1A, 1B, 2, 3A, and 3B, the pump actuated package 100 includes a container 110, a cap 120, and a pump mechanism 130. A disposable cartridge or refill cartridge 300 can be inserted into the container 110. The container 110 and the cap 120 can be formed using injection molding and similar techniques. The cap 120 can have a curved surface and/or ridges 122 thereon to ease removal and placement (e.g., fit) of the cap 120 (e.g., a replaceable cap).

The pump mechanism 130 includes a pump 132 which is in fluid communication with an inflatable bladder. The pump 132 can be made from any suitable material, for example, a urethane film or molded from rubber. The pump 132 is provisioned on (e.g., located on) a surface of the container 110 for access by a user. The pump 132 is in fluidic communication with the atmosphere via an inlet tube and in fluidic communication with the inflatable bladder via an outlet tube. The pump mechanism 130 can include a release mechanism for releasing air. The container 110 includes (e.g., defines) an opening 112 on one surface 114 for access to the pump 132.

The disposable cartridge 300 includes a pouch 310 and a cap 320. The cap 320 has ridges 322 to ease removal and placement of the disposable cartridge 300 from the container 110. A dispensing surface 324 of cap 320 has perforations or dispensing holes 326. The disposable cartridge 300 can contain a gel, semi-solid material, and the like (collectively "usable material") 340 which can flow out of the disposable cartridge 300. The useable material 340 can be a deodorant, a candy, a food item, a cosmetic, and the like.

Operationally, a disposable cartridge 300 can be placed into the container 110 and closed by the cap 120. A user can remove the cap 120 and actuate the pump mechanism 130 by pressing on the pump 132, which causes the inflatable bladder to press against the pouch 310. Compression of the pouch 310 causes the usable material 340 to exit via the perforations or dispensing holes 326. Upon exhaustion of the useable material 340, the air in the bladder can be released, the disposable cartridge 300 can be removed, and another disposable cartridge 300 can be inserted into the container 110.

Figure 6:
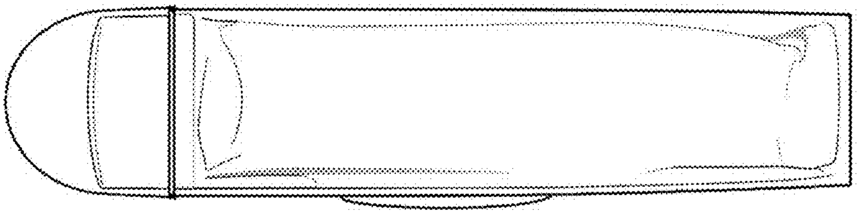
FIG. 6 is an internalized view of a pump actuated package in a fully used state in accordance with implementations.
Figure 5:
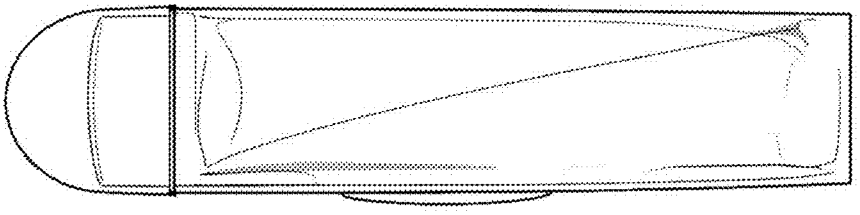
FIG. 5 is an internalized view of a pump actuated package in partially used state in accordance with implementations.
Figure 4:
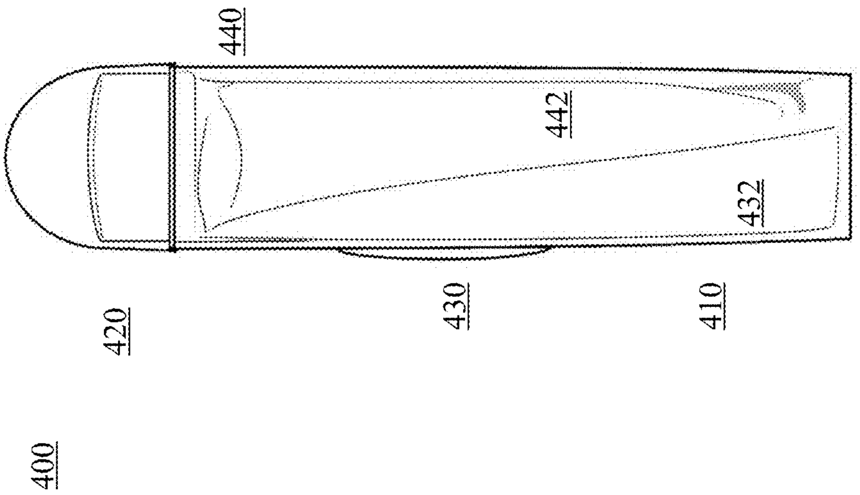
FIG. 4 is an internalized view of a pump actuated package in an initial state in accordance with implementations.

FIG. 4 is an internalized view of a pump actuated package 400 in an initial state in accordance with implementations. FIG. 5 is an internalized view of the pump actuated package 400 in partially used state in accordance with implementations. FIG. 6 is an internalized view of the pump actuated package 400 in a fully used state in accordance with implementations. The pump actuated package 400 includes a container 410, a cap 420, a pump mechanism 430 and cartridge refill 440 as described herein with respect to FIGS. 1A, 1B, 2, 3A, and 3B.

In FIG. 4, a bladder 432 of the pump mechanism 430 is in a deflated state. In FIG. 5, the bladder 432 is partially filled with air which causes a pouch 442 of the cartridge refill 440 to be in a compressed state. In FIG. 6, the bladder 432 is filled with air which causes the pouch 442 to be substantially empty of useable material.

Figure 8:
FIG. 8 is a profile view of an example diagram of a pump actuated package of FIG. 7 in accordance with implementations.
Figure 9:
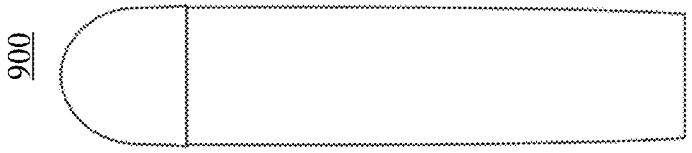
FIG. 9 is another profile view of an example diagram of a pump actuated package of FIG. 7 in accordance with implementations.
Figure 7:
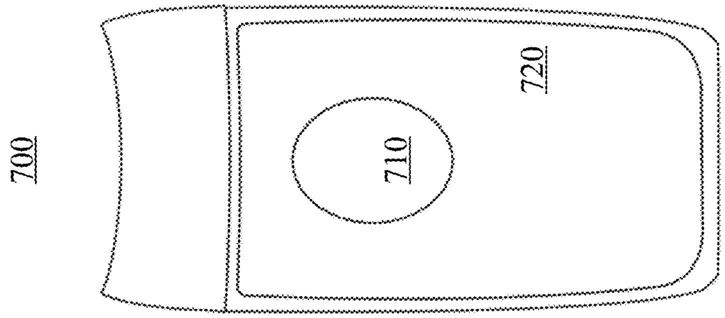
FIG. 7 is a view of an example diagram of a pump actuated package in accordance with implementations.

FIG. 7 is a view of an example diagram of a pump actuated package 700 in accordance with implementations. The pump actuated package 700 includes a pump 710 on an access surface 720 of the pump actuated package 700. FIG. 8 is a profile view of an example diagram of the pump actuated package of FIG. 7 with a first cap 800 in accordance with implementations. FIG. 9 is a profile view of an example diagram of the pump actuated package 700 of FIG. 7 with a second cap 900 in accordance with implementations.

Figure 10:
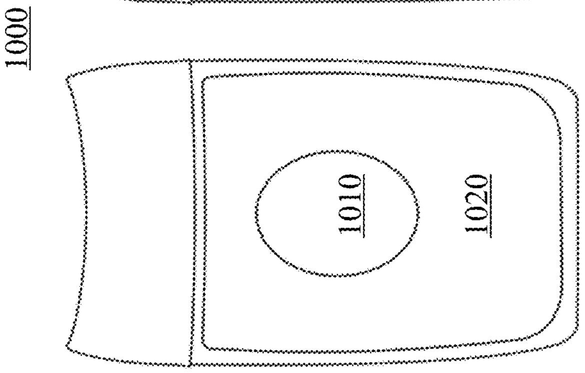
FIG. 10 is a view of an example diagram of a pump actuated package in accordance with implementations.
Figure 11:
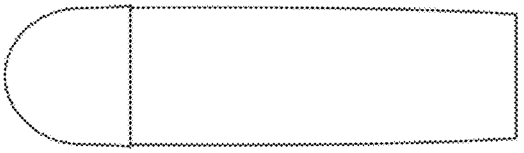
FIG. 11 is a profile view of the pump actuated package of FIG. 10 in accordance with implementations.

FIG. 10 is a view of an example diagram of a pump actuated package 1000 in accordance with implementations. The pump actuated package 1000 includes a pump 1010 on an access surface 1020 of the pump actuated package 1000. FIG. 11 is a profile view of an example diagram of the pump actuated package 1000 of FIG. 10 in accordance with implementations.

FIG. 12 is an example of a slider actuated package 1200 in an initial state in accordance with implementations. FIG. 13A is an example of the slider actuated package 1200 in a used state in accordance with implementations. FIG. 13B is a top view of the slider actuated package 1200 of FIG. 13A in accordance with implementations. FIG. 14 is an example of the slider actuated package of FIG. 13A with a cap off in accordance with implementations. FIG. 15A is an example of a disposable cartridge for use in the slider actuated package 1200 of FIGS. 12-14 in accordance with implementations. FIG. 15B is a top view of a dispensing surface of the disposable cartridge of FIG. 15A in accordance with implementations.

Referring to FIGS. 12, 13A, 13B, 14, 15A and 15B, the slider actuated package 1200 includes a container 1210, a cap 1220, and a slider mechanism 1230. A disposable cartridge or refill cartridge 1500 can be inserted into the container 1210. The container 1210 and the cap 1220 can be formed using injection molding and similar techniques. The cap 1220 can have ridges 1222 to ease removal and placement of the cap 1220.

The slider mechanism 1230 includes a slider 1232 which is integrated with a platform component on which is positioned the disposable cartridge 1500.

The disposable cartridge 1500 includes a pouch 1510 and a cap 1520. The cap 1520 has ridges 1522 to ease removal and placement of the disposable cartridge 1500 from the container 1210. A dispensing surface 1524 of cap 1520 has perforations or dispensing holes 1526. The disposable cartridge 1500 can contain a gel, semi-solid material, and the like (collectively "usable material") 1540 which can flow out of the disposable cartridge 1500. The useable material 1540 can be a deodorant, a candy, a food item, a cosmetic, and the like.

Operationally, a disposable cartridge 1500 can be placed into the container 1210 and closed by the cap 1220. A user can remove the cap 1220 and actuate the slider mechanism 1230 by sliding the slider 1232 toward the dispensing surface 1524, which causes the platform to push the pouch 1510 against the dispensing surface 1524. Compression of the pouch 1510 causes the usable material 1540 to exit via the perforations or dispensing holes 1526. Upon exhaustion of the useable material 1540, the slider 1232 can be returned toward a bottom of the container 1210, the disposable cartridge 1500 can be removed, and another disposable cartridge 1500 can be inserted into the container 1210.

Figures 16, 17:
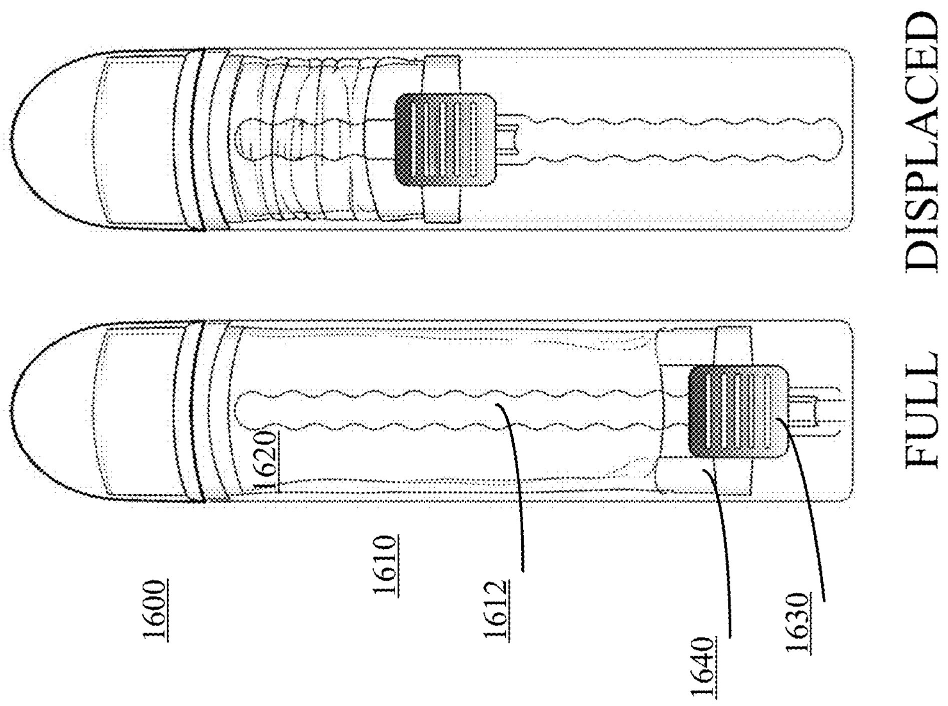
FIG. 16 is a view of an example diagram of a slider actuated package in a full or initial state in accordance with implementations.
FIG. 17 is a view of an example diagram of a slider actuated package in a dispensed or used state in accordance with implementations.

FIG. 16 is a side view of an example diagram of a slider actuated package 1600 in a full or initial state in accordance with implementations. FIG. 17 is a side view of the slider actuated package of FIG. 16 in a dispensed or used state in accordance with implementations. The slider actuated package 1600 is as described with respect to FIGS. FIGS. 12, 13A, 13B, 14, 15A and 15B. The slider actuated package 1600 includes a scalloped-like access area 1610 on an access surface 1620 which permits a user to slide a slider 1630 connected to a platform 1640 to dispense a useable material. The scalloped-like access area 1610 includes slots 1612. The scalloped-like access area 1610 is configured to prevent the slider 1630 and the platform 1640 from moving down or slipping due to inertia. That is, the slider 1630 and the platform 1640 remains in a slot of the slots 1612 once positioned in the slot.

Figures 18, 19, 20, 21, 22:
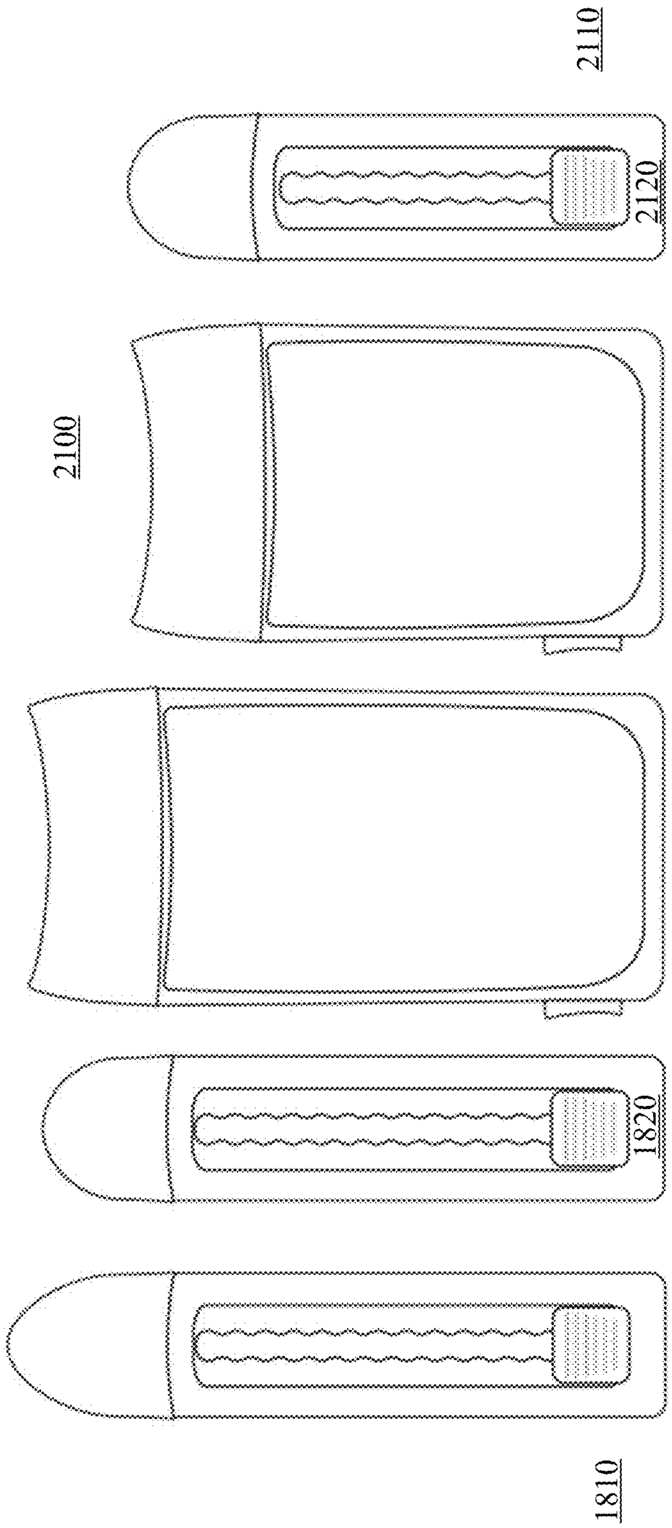
FIG. 18 is a view of an example diagram of a slider actuated package in accordance with implementations.
FIG. 19 is a profile view of an example diagram of a slider actuated package of FIG. 18 in accordance with implementations.
FIG. 20 is another profile view of an example diagram of a slider actuated package of FIG. 18 in accordance with implementations.
FIG. 21 is a view of an example diagram of a slider actuated package in accordance with implementations.
FIG. 22 is a profile view of the slider actuated package of FIG. 21 in accordance with implementations.

FIG. 18 is a view of an example diagram of a slider actuated package 1800 in accordance with implementations. The slider actuated package 1800 includes a slider mechanism 1810 on an access surface 1820 of the slider actuated package 1800. FIG. 19 is a profile view of an example diagram of the slider actuated package of FIG. 18 with a first cap 1900 in accordance with implementations. FIG. 20 is a profile view of an example diagram of the slider actuated package 1900 of FIG. 18 with a second cap 2000 in accordance with implementations.

FIG. 21 is a view of an example diagram of a slider actuated package 2100 in accordance with implementations. The slider actuated package 2100 includes a slider mechanism 2110 on an access surface 2120 of the slider actuated package 2100. FIG. 22 is a profile view of an example diagram of the slider actuated package 2100 of FIG. 21 in accordance with implementations.

The actuator based packaging for use with cartridge refills described herein may be manufactured using compression molding, injection molding and other like production processes. The actuator based packaging for use with cartridge refills may be made from biodegradable materials, recyclable materials, sustainable materials, and the like.

The construction and arrangement of the methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A package comprising:
- a container configured to hold a replaceable cartridge refill, wherein the replaceable cartridge refill comprises:
  - a flexible pouch configured to contain a useable material; and
  - a cap connected to the flexible pouch, the cap including holes for dispensing the useable material;
- a replaceable cap configured to fit the container; and
- an actuator mechanism located on a side surface of the container, the actuator mechanism configured to compress the flexible pouch of the replaceable cartridge refill to dispense the useable material contained in the flexible pouch, wherein the side surface of the container defines an opening, and wherein the actuator mechanism is accessed through the opening.

2. The package of claim 1, wherein the actuator mechanism is a pump mechanism.

3. The package of claim 2, wherein the pump mechanism comprises:
- a bladder; and
- a pump in communication with the bladder,
- wherein the bladder presses against the replaceable cartridge refill when the bladder is inflated by a user pressing on the pump.

4. The package of claim 3, wherein the pump mechanism further comprises a release mechanism for releasing air.

5. The package of claim 1, wherein the cap of the container includes a curved surface having ridges thereon.

6. A system comprising:
- at least one disposable pouch configured to contain content, wherein the at least one disposable pouch comprises:
  - a flexible pouch configured to contain the content; and
  - a perforated cap connected to the flexible pouch, the perforated cap configured to dispense the content from the flexible pouch;
- a container configured to replaceably hold the at least one disposable pouch;
- a cap configured to removably fit the container; and
- an actuator mechanism integral with the container, the actuator mechanism configured to compress the flexible pouch to dispense the content, wherein the actuator mechanism is a pump mechanism that comprises:
  - a bladder; and
  - a pump in fluidic communication with the bladder, wherein the bladder presses against the pouch when the bladder is inflated by a user pressing on the pump.

7. A package comprising:
- a container configured to hold a replaceable cartridge refill, wherein the replaceable cartridge refill comprises:
  - a flexible pouch configured to contain a useable material; and
  - a cap connected to the flexible pouch, the cap including holes for dispensing the useable material;
- a replaceable cap configured to fit the container; and
- an actuator mechanism located on a side surface of the container and configured to compress the flexible pouch of the replaceable cartridge refill to dispense the useable material contained in the flexible pouch, wherein the actuator mechanism is a pump mechanism that includes:
  - a bladder; and
  - a pump in communication with the bladder, wherein the bladder presses against the replaceable cartridge refill when the bladder is inflated by a user pressing on the pump.

8. The package of claim 7, wherein the pump mechanism further comprises a release mechanism for releasing air.

9. The package of claim 7, wherein the cap of the container includes a curved surface having ridges thereon.

10. The package of claim 7, wherein the side surface of the container defines an opening, and wherein the pump mechanism is accessed through the opening of the container.

11. The package of claim 7, wherein the pump is in fluidic communication with an atmosphere via an inlet tube.

12. The package of claim 7, wherein the pump is in fluidic communication with the bladder via an outlet tube.

13. The package of claim 7, wherein the replaceable cartridge refill is configured for insertion into the container.

* * * * *